United States Patent [19]

Bretz

[11] 4,064,222

[45] Dec. 20, 1977

[54] NITROGEN FIXATION AND MOLECULAR MAGNETO HYDRODYNAMIC GENERATION USING A COAL GASIFICATION GAS STREAM

[75] Inventor: George Miller Bretz, Verona, Pa.

[73] Assignee: Koppers Company, Inc., Pittsburgh, Pa.

[21] Appl. No.: 785,460

[22] Filed: Apr. 7, 1977

Related U.S. Application Data

[63] Continuation-in-part of Ser. No. 659,728, Feb. 20, 1976, abandoned.

[51] Int. Cl.$^2$ .................... H02K 21/20; C01B 21/20
[52] U.S. Cl. .................. 423/393; 423/210.5; 423/400; 48/202; 48/210; 310/11
[58] Field of Search ............ 423/393, 400, 405, 210.5; 48/63, 64, 206, 202, 210; 310/11

[56] References Cited

U.S. PATENT DOCUMENTS

| | | | |
|---|---|---|---|
| 1,098,534 | 6/1914 | Servals | 48/63 |
| 1,443,091 | 1/1923 | Petersen | 423/405 X |
| 2,965,461 | 12/1960 | Walker | 48/206 |
| 3,303,364 | 2/1967 | Hals | 310/4 |
| 3,439,196 | 4/1969 | Hals | 423/405 X |
| 3,471,723 | 10/1969 | Maslan | 310/11 |
| 3,546,499 | 12/1970 | Somers | 310/11 |
| 3,671,185 | 6/1972 | LeFrancois | 423/210.5 |
| 3,919,390 | 11/1975 | Moore | 423/210.5 |

FOREIGN PATENT DOCUMENTS

| | | | |
|---|---|---|---|
| 2,400,772 | 9/1975 | Germany | 48/210 |

*Primary Examiner*—G. O. Peters
*Attorney, Agent, or Firm*—R. Lawrence Sahr; Oscar B. Brumback

[57] ABSTRACT

A method of generating electricity and fixing nitrogen oxides is disclosed in which coal is gasified at high pressure to produce a mixture of carbon monoxide and carbon dioxide, with a minimal amount of hydrogen and water, as a gas stream. This high pressure gas stream is mixed with an oxidant to introduce mixtures of nitrogen and oxygen and then completely combusted. The high temperature combustion gas is then further ionized to form a plasma and its velocity is increased, while its high pressure is maintained. The high pressure, high velocity plasma is fed into an MHD generator to produce electricity and where it is adiabatically expanded to fix the nitrogen oxides contained therein. The final gas stream, with the fixed nitrogen oxide compounds therein, is thereafter reacted to form nitric acid.

33 Claims, 2 Drawing Figures

NITROGEN FIXATION AND MOLECULAR MAGNETO HYDRODYNAMIC GENERATION USING A COAL GASIFICATION GAS STREAM

CROSS-REFERENCE TO RELATED APPLICATION

This application is a continuation-in-part of Application Ser. No. 659,728, filed Feb. 20, 1976, now abandoned.

BACKGROUND OF THE INVENTION

1. Field of the Invention

This invention relates to electrical power generation utilizing the principles of molecular hydrodynamics and the fixation of nitrogen compounds for the subsequent production of nitric acid therefrom. More particularly, the invention relates to magneto hydrodynamic (MHD) generation of electricity using the producer gas stream of a coal gasification process, and the fixation of nitrogen oxides contained therein.

2. Description of the Prior Art

Because of the scarcity of fossil fuels and the increased costs in mining and obtaining these fossil fuels, there is interest in new more economical methods of generating electric power. Among these methods, which have been under investigation, are magneto hydrodynamics (MHD). The process of MHD power generation involves passing a hot gas at an elevated temperature through a magnetic field to generate electric power. At a high temperature, the gas is conductive and ionizable by seeding it with one or more of a plurality of materials such as alkali metal salts. After the gas is passed through the MHD generator, its velocity is reduced and it is cooled, usually with cooling water which is heated by the gas and converted to steam to be further used in the generation of power with conventional steam turbines.

One type of gas used in such MHD power generation is combustion gas. A carbonaceous fuel is combusted to form a hot combustion gas sufficient in temperature to become conductive. Such a combustion gas is termed a plasma. Combustion implies oxidation and therefore an oxidizing media is required, usually air or oxygen enriched air, to combine with the carbonaceous fuel to form the products of combustion. To produce the higher temperatures of combustion required to render the combustion gas conductive, and thus a plasma, a stoichiometric balance is required between the fuel and the oxidizing medium to form a total combustion of the carbonaceous molecules. Theoretically this dictates the addition of just enough oxidizer to completely oxidize the carbon. Practically, a modest overbundance of oxidizer is normally supplied to insure complete combustion. Too much oxidizer will decrease the heat of combustion. A balance must be struck.

During the process of combustion of carbonaceous fuels nitrogen is freed, both from the fuel and extracted from the natural makeup of air. The nitrogen, however, tends to combine at elevated temperatures with free oxygen to form nitrogen oxides. Recently, it has come to be commonly understood that nitrogen oxides in the atmosphere are harmful, even in minute amount, to living organisms. Thus the trend is toward minimizing the exhaust of nitrogen oxides into the atmosphere. One way of doing this is to decrease the level of oxidation by carrying out the combustion in a fuel rich atmosphere, thus reducing the amount of free oxygen resulting in the formation of nitrogen oxides.

Another approach is to collect the nitrogen oxides which are formed before they escape into the atmosphere. This is a difficult and costly process to the extent of being burdensome of carried out as an end in itself. However, if the nitrogen oxides can be readily converted into usable commodities on an economically feasible scale, not only is the project economically possible but it becomes profitable. One of the key factors in profitability is to be able to generate sufficient quantities of nitrogen oxides to supply a conversion plant pursuant to commercial viability. Thus, the approach becomes one of increasing the formation of nitrogen oxides rather than decreasing them.

An MHD generator happens to be a device that readily lends itself to an enhancement of the formation of commercially usable nitrogen oxides as an auxiliary side effect to the production of electric energy.

U.S. Pat. No. 1,443,091 to Petersen teaches the process of generating electricity by means of flowing ionized gas through a magnetic field in an MHD generator to form nitrogen oxides. In addition, Petersen U.S. Pat. No. 1,443,091 teaches increasing the temperature of the gas within the MHD generator to form nitrogen oxides. This temperature increase is to be accomplished by concentrating the direction of the electric current. Petersen U.S. Pat. No. 1,443,091 also teaches using excess air or decomposing carbonic acid or steam to produce "...the oxygen necessary for the production of nitric oxide...", column 4, line 61–62. And further, Petersen U.S. Pat. No. 1,443,091 teaches conversion of the produced nitrogen oxides to, inter alia, nitric acid.

U.S. Pat. No. 3,439,196 to Hals adds to the teachings of Petersen U.S. Pat. no. 1,443,091 the concept of rapid cooling of the gas to fix the nitrogen oxides and that such cooling can be accomplished by rapidly expanding the gas. Hals U.S. Pat. No. 3,439,196 also teaches adding between 50% to 100% excess oxygen to a stoichiometric mixture of fuel gas and oxygen, prior to combustion, to increase the quantity of nitrogen oxides formed even though the temperature of the plasma gas resulting from that combustion will be lowered and, thus, less efficient in producing electricity when passed through the MHD generator. To overcome this decreased efficiency, Hals U.S. Pat. No. 3,439,196 discloses a method of increasing the temperature of the plasma gas by channeling it through an electric arc prior to introduction of that plasma into the MHD generator. The energy to operate the electric arc is to be produced by the MHD generator. Hals U.S. Pat. No. 3,439,196 further teaches the necessity of using a diffuser to reduce the temperature of the plasma stream, after exit from the MHD generator, to reduce the temperature at a rate rapid enough to fix substantial quantities of nitrogen oxides, and, that to accomplish such fixation, the plasma must enter the MHD generator at a supersonic velocity. Finally, Hals U.S. Pat. No. 3,439,196 teaches seeding plasma with an alkali metal to increase ionization.

U.S. Pat. No. 3,471,723 to Maslan states the inference, made in Hals U.S. Pat. No. 3,439,196 that the higher the temperature, the more nitrogen oxides are formed and, thus, the higher the concentration of nitrogen oxides in the plasma gas. Maslan U.S. Pat. No. 3,471,723 discloses simply a method of heating air to a high temperature to produce appreciable quantities of nitrogen oxides. The heat is imposed by channelling the air, already preheated, through an electric arc, the energy for which is produced from an MHD generator through which the superheated air is passed. Maslan U.S. Pat. No. 3,471,723 teaches that a separate expansion nozzle is not necessary, as a great degree of expansion can take place within the MHD generator itself, thus the temperature of the plasma is reduced, by the combination of the MHD generator and a diffuser, at a rapid enough rate to fix nitrogen oxides contained in the plasma. Maslan U.S. Pat. No. 3,471,723 does teach the use of a diffuser, but not as a sole means to cool the gas as in Hals U.S. Pat. No. 3,439,196. Rather, the diffuser is used as both a velocity reducer and a supplemental cooler for plasma exiting the MHD generator. However, it is clear that a temperature below that of the decomposition of nitrogen oxides is not achieved until the plasma is passed through the diffuser. (See Maslan U.S. Pat. No. 3,471,723, Col. 5, line 70, to Col. 6, line 3.) Further, Maslan U.S. Pat. No. 3,471,723 does not teach the use of combustion gases in the system, but rather, directs one skilled in the art away from such gases (see Maslan U.S. Pat. No. 3,471,723, Column 4, lines 54–67). Finally, Maslan U.S. Pat. No. 3,471,723, like Hals U.S. Pat. No. 3,439,196, teaches seeding the gas with alkali metals or their salts.

U.S. Pat. No. 3,546,499 to Somers adds to the prior art the suggestion that the abstraction of electrical energy from the plasma gas passing through a MHD generator, by itself, cools the gas to some degree. The essence of the disclosure of Somers U.S. Pat. No. 3,546,499 is novel: a method and means of cooling the plasma gas, after it exits the MHD generator, in a water spray diffuser, to fix therein nitrogen oxides. Somers U.S. Pat. No. 3,546,499, like Hals U.S. Pat. No. 3,439,196, teaches the use of high temperature combustion gases, enriched with oxygen to form nitrogen oxides, for a plasma directed into an MHD generator. Like Hals U.S. Pat. No. 3,439,196, Somers U.S. Pat. No. 3,546,499 also teaches the need for rapid cooling of the plasma to fix the formed nitrogen oxides. And like Hals U.S. Pat. No. 3,439,196, Somers U.S. Pat. No. 3,546,499 teaches seeding the plasma to increase ionization.

To summarize, the above discussed prior art teaches that gases of combustion can be used to generate electricity by passing them through an MHD generator, that the combustion gas, or plasma, can be further ionized by increasing its temperature and seeding it with an alkali metal or its salt, that by adding excess oxygen to the plasma gas and further increasing its temperature, that nitrogen oxides are formed, that to recover the nitrogen oxides as such, they must be fixed by rapidly cooling the plasma, that a partial cooling can be brought about by rapidly expanding the plasma within the MHD generator, and that to completely fix the nitrogen oxides some means of further cooling the gas beyond the MHD generator is practically necessary.

The most plentiful carbonaceous fuel available is coal. Therefore, it is natural to contemplate coal as a carbonaceous fuel to be gasified in the production of plasma. The current state of the art regarding the gasification of coal is treated in a recent article by Harry Perry entitled, "The Gasification of Coal" published in SCIENTIFIC AMERCIAN Volume 230, Number 3 at page 19 et seq., in March 1974. Of particular interest is the gasification method described therein as the "Koppers-Totzek Process," a well-known method to those skilled in the art. This process is fully described in a treatise "The Production of Gas From Coal Through a Commercially Proven Process" published by Koppers Company, Inc. of Pittsburgh, Pa. 15219 in August 1973.

The K-T Process (Koppers-Totzek) employs the partial oxidation of pulverized coal in suspension with oxygen and steam. The gasifier is a refractory lined steel shell equipped with a steam jacket for producing low-pressure process steam. A two-headed gasifier may be used which is capable of gasifying over 400 tons of coal per day. Coal, oxygen and steam are brought together in opposing gasifier burner heads spaced 180° apart. A four-headed gasifier, capable of gasifying 850 tons of coal per day, employing burner heads 90° apart, may also be used. The coal is gasified almost completely and instantaneously, reacting in the gasifier at a slight positive pressure and at about 3300° F. Carbon conversion is a function of the reactivity of coal, approaching 100 percent for lignites.

Gaseous and vaporous hydrocarbons emanating from the coal at medium temperatures are passed through a zone of very high temperature in which they react so rapidly that coagulation of coal particles during the plastic stage does not occur. The carbon and volitile matter of the coal are gasified, and the coal ash is converted into molten slag. Thus, any coal can be gasified irrespective of coking property, ash content or ash fusion temperature.

As a result of the endothermic gasification reactions and radiation to the refractory walls, the exit gas temperature is decreased to a temperature range exemplified by 2750° F. At the prevailing operating temperatures, only gaseous products are produced. No tars, condensable hydrocarbons or phenols are formed and the process is essentially pollution-free.

Approximately 50 percent of the coal ash drops out as slag into a slag quench tank below the gasifier. The remaining ash is carried out of the gasifier as fine fly ash. Flux can be added to the coal feed to adjust the ash fusion temperature characteristics.

The gasified coal is bled off from the gasifier, at a rate by which equilibrium pressure is maintained within the gasifier, to be used as a combustion fuel.

U.S. Pat. No. 3,916,390 to Moore teaches that a low Btu producer gas can be produced by contacting steam and coal with an oxygen containing gas such as air at a temperature of about 800° to 950° C. (1472° to 1742° F.) Moore U.S. Pat. No. 3,916,390 teaches that such producer gas also contains hydrogen sulfide and carbonyl sulfide. The essence of the invention of Moore U.S. Pat. No. 3,916,390 is a method of stripping the sulfides out of that producer gas. This is done by flowing the sulfide contaminated producer gas through a molten ternary eutectic composition composed of lithium carbonate, sodium carbonate and potassium carbonate to which calcium carbonate is added to extend the temperature range in which the ternary eutectic is functional in respect to cleaning. Since the producer gas manufactured by the process described in Moore U.S. Pat. No. 3,916,390 does not approach the minimum required to generate electricity by way of an MHD generator (Somers U.S. Pat. No. 3,546,499 teaches the minimum required plasma temperature to be 3800° F. at Column 1, lines 49–50), the teachings in relation to MHD generators can only be taken to disclose a method of stripping sulfides from a combustion gas.

To further summarize, the prior art reveals a commercially viable method and apparatus for low pressure gasification of coal along with a method by which sulfides can be stripped from the gasified coal by passing the gasified coal through a melt of alkali metals. The implication is then clear that the stripped gasified coal could be used to produce electric power by MHD generator means with after recovery of nitrogen oxides.

However, major problems exist, the first of which deals with the ash inclusions in the gasified coal. Ash prevents the maximization of the ionization of plasma by the fact that it is electrically inert. The ash also tends to build up on the interior surfaces of the MHD duct.

Sulfur presents a second problem. The alkali metal seeding materials used to increase ionization have a high affinity for sulfur, thus a ready reaction to form alkali sulfur compounds. It is difficult and costly to extract the alkali metals from the sulfur for reuse. Further, the degree of heat required for MHD power generation is far above the point of vaporization of alkali metals, thus a bath of molten alkali metals is unusable to strip sulfur.

The third problem is found in the use of gasified coal. Gasified coal inherently includes dissociated water vapor in the form of $H_2$. $H_2$ is about the lightest possible elemental compound in terms of molecular weight. MHD power generation depends on ionization of chemical compounds and the potential for ionization depends to an extent on the molecular weight of the molecules extrapolated by their valences. Inclusion of $H_2$ excludes higher weight molecules of other compounds and thus diminishes the efficiency of MHD energy generation.

The fourth problem is found in the use of diffusers downstream from the MHD generator. The nature of diffusers is such that they tend to re-compress gases thus increasing their temperature. Thus, the potential exists for a second dissociation of the once fixed nitrogen oxides. If the diffuser operates at theoretical efficiency, heat transfer will more than compensate for the tendency to increase temperature. But, when coal gasification ash is passed through a diffuser, it will adhere to its walls and greatly decrease the efficiency of heat transfer.

The fifth problem is that power is consumed to move the plasma through the MHD generator at a velocity sufficient to generate sufficient quantities of electrical energy. This is compounded by the fact that the prior art systems also tend to use energy produced by the MHD system to preheat the plasma to usable temperatures. Both of these power drains decrease the external efficiency of the system and its potential for producing independently usable energy.

The present invention provides a solution to these problems by presenting an integrated system by eliminating the causes. Means are provided by which ash never reaches the MHD generator duct, sulfur is removed from the plasma before seeding material is introduced, $H_2$ is substantially removed from the plasma before it reaches the MHD generator duct, nitrogen oxides are completely fixed before exit from the MHD generator duct, the plasma is self-compressed and heated without imposition of external energy or drain of energy produced by the MHD generation system.

SUMMARY OF THE INVENTION

The invention comprises a method for both generating electricity and fixing nitrogen oxides which is comprised of gasifying coal to form a gas which has as its main constituents carbon monoxide, hydrogen, $CO_2$ and water. This gas is then cleaned of a major portion of the sulfur contaminants in the gas and is further combusted with air or oxygen enriched air which introduces nitrogen into the gas stream, decreases the amount of $H_2$, the raises the temperature of the gas sufficient for MHD power generation. The gas is adiabatically expanded while being simultaneously passed through the MHD generator which cools the gas rapidly, and fixes the nitrogen oxide compounds which are to be subsequently used in the production of nitric acid.

Preferably, the coal is gasified by a high pressure single stage gasification method wherein the coal, coke or other carbonaceous material is prepared by pulverizing and drying it. The prepared coal is transferred to a high pressure zone and fed at a metered rate and at a fixed proportion to oxygen and steam. This reactant stream is fed into a high pressure gasifier zone. The coal, oxygen, and steam are fed into the gasifier zone by a plurality of pairs of reaction mixture streams, with each member of the pair being annularly juxtaposed to the other member along the same axis and every pair having a common point of intersection at the axes of the streams. The coal is gasified in the gasification zone leaving only a molten ash, most of which is removed by precipitation through the product gas stream.

The primary source of feedstock for the system of the invention is pulverized coal, although any carbonaceous material properly prepared may be utilized in the practice of the invention. The coal used may have high ash and/or sulfur content. For example, lignite with ash content of 35 percent may be used. The percentage of carbon converted of the coal gasified usually is inversely proportional to the coal rank. Thus, conversion of lignites and sub-bituminous coals approaches 100 percent, while High Volatile A (ASTM designation) coal conversion is approximately 95 to 97 percent. The coal is dried as part of the preparation prior to gasification.

In the gasification process, a low viscosity liquid slag must be formed so that any gas borne ash particles will coalesce and drop into a slag pool or reservoir, and the slag will flow readily from the gasifier into a slag disposal zone which will be described herein. Preferably, the ash should have an initial deformation temperature that is close to its fusion point. If the initial deformation temperature and fusion temperatures are too far apart, for example, greater than 120° C., a sticky slag is formed. Accordingly, for coals having a deformation fusion temperature differential range of greater than about 120° C., a flux can be added to the pulverized coal during preparation, to decrease the temperature range between deformation point and fusion point.

The pulverized coal is prepared, with or without the addition of flux, and is pneumatically conveyed to a transfer means. The transfer means is adapted to receive the pneumatically conveyed pulverized coal from the preparation station, pressurize the coal and feed it, under pressure, into a mixing chamber where it is entrained with steam for high velocity delivery to the burner where it is mixed with oxygen. The steam and oxygen are introduced into the mixing chamber at a pressure of about 10 psi greater than the pressure prevailing in the gasifier vessel and at a rate greater than the flame propagation rate, for example, 300 to 400 ft./sec. This range of delivery speeds is adequate to exceed the flashback velocity of the fuel and oxidant within the gasifier when it is being operated at an internal range of pressure of 250 to 300 psi (absolute).

The combustion system in the gasifier consists preferably of two, four, or six burner nozzles, each injecting a stream of reaction constituents from a concentric pair of feeder tubes, constituting the nozzle, and disposed along the same axis, the axially central tube being the channel for entrained coal and the outer annular tube being the channel through which flows the oxygen. Each nozzle injects a reaction constituent stream along the same axis to another such nozzle and each such pair is disposed so that the reaction constituents are directed to the center of the combustion zone and are reacted generally in the central area of the burner at the intersection of the several axes of the various pairs of reaction mixture streams.

By metering the coal flow and, proportionally, the oxygen, a stable flame is produced at the discharge end of the burner nozzles having a temperature range of from about 3000° to 4500° F. The flame temperature is determined by the rate of injection of the reactant gas stream and coal and since the total reaction is exothermic, more heat is generated than is necessary to convert the coal to its gaseous products, particularly with a combustion zone as is previously described which provides for gasification of the coal.

Because the gas stream is to be further combusted to raise its temperature before entering the MHD generator, the temperature of the producer gas from the gasification zone should be as high as practically possible within the working range of the gasifier refractories. Further, the total energy of the producer gas is regulated by both its temperature and pressure, hence both temperature and pressure should be maximized. At high pressures the rate of heat release is so great that extremely high gas temperatures result. Thus it is desirable to gasify the coal at pressures of at least 250 psi.

A further consideration relating to gasification temperature is the necessary precipitation of the slag forming constituents of the coal. The carryover properties of the molten slag are affected both by gas density and gas viscosity at constant velocity. The greatest effect, moreover, is due to the increase in the viscosity of the gas due to its increase in temperature. Hence, the gasification temperatures must be adjusted between 2800° and 3200° F. to provide for maximum energy and precipitation of a major portion of the molten slag. Maintenance of the gasification temperature within this range also prevents, to a great degree, the volitilization of fluxed ash precipitating from the reaction.

The temperature in the gasification zone may be lowered by the addition of $CO_2$ into the reaction mixture stream. Because of the endothermic nature of the reaction:

$$CO_2 + C \rightarrow 2CO$$

the carbon dioxide in the reacting gas stream reduces the flame temperature. Hence the $CO_2$ can be fed at a desired rate to achieve optimum regulated flame temperatures.

Further, the flux which may be added to the coal reacting gas stream can be a carbonate such as calcium carbonate or dolomitic limestone or the like which not only reduces the solidification temperature of the slag but also requires endothermal heat of calcination and also releases $CO_2$, hence reducing the flame temperature. In order to remove the slag efficiency from the product gas stream, the viscosity of the product gas should be as possible to prevent the product gas from carrying the slag to areas of the process in which it can no longer be precipitated as in the burner zone. Because the viscosity of the gas is directly proportional to its temperature, the minimization of the gas viscosity is accomplished by the reduced flame temperature adjusted by the addition of $CO_2$ to the reacting gas stream while maintaining maximum energy in the gas producer stream.

In another embodiment of the invention, the coal steam, $CO_2$ (if desired) and oxygen are fed through juxtaposed burners which are positioned in a manner such that the gas stream emanates to form an acute angle of intersection rather than an intersection along the common axis of the burner pairs. Specifically, the burners are mounted on a common plane but are directed downwardly at an acute angle from the horizontal. The emanating gas streams intersect at a point below the common plane at a mid-point between the burners. Thus, as the coal is gasified, the reaction constituents are propelled onto a molten slag bath which lies beneath the point of intersection. Thiss molten slag bath slowly flows to the bottom of the gasification vessel and the slag is continuously cast by continuous casting apparatus, while being solidified, and is removed from the process. This method of gasification provides a pressure seal at the bottom of the gasification vessel by virtue of the molten slag bath in close contact with the walls of the gasification vessel and provides for the removal of the slag by continuous casting. The proximity of the reaction point, being just above the molten surface of the slag bath, is such that the heat of the reaction is projected onto the molten pool, raising its temperature to a degree sufficient to insure that the slag remains in a molten state.

The fluxes that can be fed into the gas stream through the burners, being limestone (dolomite) and various iron oxides, serve an additional purpose to slag melting point control. The sulfur in the coal reacts with the calcium and iron, at the reaction point, to form CaS and FeS, hence removing the sulfur from the producer gas stream in the form of precipitable molten (plastic) state solid. The removal of sulfur is desirable because of its adverse affect on the seeding materials (to be further described) in the MHD generation process, and, further, removal of the sulfur at this point eliminates the problem of separating $SO_2$ from the nitrogen oxides in the gas stream discharging from the MHD generator duct.

Where fluxes are not used to control slag transformation points, the producer gas, containing sulfur, is conducted through means of sulfur removal which react the sulfur with a combination of calcium carbonate and magnesium oxide to form CaS and MgS which precipitate out as a molten (plastic) state solid.

The gas produced, which is predominantly CO (about 57 percent) and $H_2$ (36 percent), is removed from the gasification vessel, while still under pressure at a temperature between about 2800° and 3200° F., and is mixed with a preheated oxidant which is rich in nitrogen. Typically, the oxidant will be preheated air with additional oxygen added. The largest constituent part of the air is, of course, nitrogen. Simultaneously introduced into the producer gas is lime to react out any residual sulfur in the producer gas stream.

The oxidant rich in nitrogen, the producer gas and the lime are then conducted to a cyclone combustor for combustion. In the cyclone combustor, the air and the producer gas react to raise the temperature of the gas stream to a range of about 4800° F. to 5200° F. in preparation for introduction into the MHD generator. The combustion reaction serves to eliminate the $H_2$ in the gas by combining that $H_2$ with oxygen and carbon. Nitrogen oxides are produced which are to be subsequently fixed during the adiabatic expansion incident to MHD generation. The cyclone combustor not only completely oxidizes all of the producer gas stream, but because of the presence of the lime, reacts with the residual sulfur in the producer gas stream to form calcium sulfate which is separated, hence removing any residual solids from the gas stream to be introduced into the MHD generator.

Because the coal gasification is accomplished in the absence of air, the air introduced into the cyclone combustor can be mixed with oxygen to provide for total oxidation and additionally to adjust the level of nitrogen within the gas stream to form the preferred concentration of nitrogen oxides to later be fixed and sent through the nitric acid conversion step.

The reaction $N_2 + O_2 = 2NO$ is a reversible reaction and requires high temperatures which are provided by the oxidation of the producer gas from the gasification stream and is enhanced by high pressure combustion, the pressure of the gasification reaction being maintained through this point in the system.

The reaction occurring within the cyclone combustor is the oxidation of the producer gas stream to $CO_2$ and $H_2O$. Additionally, the nitrogen reacts with oxygen to produce NO, $NO_2$, and $N_2O$. The desired reaction product for the production of nitric acid is $NO_2$.

The reaction sequences are as follows:

$$N_2 + O_2 \rightleftarrows 2NO \quad (1)$$

$$2NO + O_2 \rightleftarrows 2NO_2 \quad (2)$$

Both reactions (1) and (2) are reversible; however, reaction (1) is exothermic and reaction (2) is endothermic.

Kinetically reaction (1) can be described by the second order rate equation:

$$dp_{NO}/dt = k_1 P_{N_2} P_{O_2} - k_2(P_{NO})^2 \ldots - 38{,}000 \text{ Btu lb./mole}$$

For the reverse reaction:

$$2NO \rightarrow N_2 + O_2 \quad (3)$$

$$+ 38{,}000 \text{ Btu lb./mole}$$

the reaction kinetics can be described as:

$$- dp_{NO}/dt = K_2(p_{NO})^2 - k_1 p_{N_2} p_{O_2}$$

Reaction (2) is exothermic liberating 24,250 Btu lb./mole.

Reaction (2) is favored by pressure and hence the process of the invention being operated between 250 to 300 psi produces more $NO_2$ than would an atmospheric pressure process.

The reaction mechanism for the formation of NO in heated air is primarily as follows:

$$N_2 + O \rightleftarrows NO + N \quad (3)$$

$$N + O_2 \rightleftarrows NO + O \quad (4)$$

Reaction (3) has a very large activation energy and is controlled by the O atom concentration. Hence, at high temperatures NO will form at an appreciable rate and will readily freeze on cooling. Further description of the reactions of nitrogen with oxygen are found in "Combustion Technology: Some Modern Developments," Palmer and Beer, ACADEMIC PRESS 1974, pp. 18-20.

The producer gas stream combusted in the presence of various concentrations of nitrogen and oxygen at atmospheric pressure yielded the following compositions:

TABLE I

| Compound | Gas Composition, mole % | | | | |
|---|---|---|---|---|---|
| | A | B | C | D | E |
| CO | 50.81 | 24.3 | 21.0 | 17.2 | 26.0 |
| $CO_2$ | 5.29 | 17.8 | 16.0 | 25.6 | 15.1 |
| H | | 4.27 | 3.56 | 2.96 | 4.27 |
| OH | | 8.63 | 7.22 | 7.12 | 6.63 |
| $H_2$ | 29.26 | 4.02 | 3.49 | 2.62 | 4.95 |
| $H_2O$ | 11.92 | 21.7 | 19.5 | 17.4 | 21.1 |
| $H_2S$ | 1.75 | | | | |
| NO | | 0.34 | 1.46 | 1.9 | 1.03 |
| $N_2$ | 0.91 | 0.51 | 12.5 | 16.6 | 10.5 |
| O | | 5.4 | 4.35 | 4.77 | 3.38 |
| SO | | 0.29 | 0.24 | 0.19 | 0.33 |
| $O_2$ | | 11.7 | 9.79 | 12.8 | 5.8 |
| $SO_2$ | | 1.0 | 0.89 | 0.83 | 0.92 |
| Total | 99.94 | 99.96 | 100.0 | 99.99 | 99.98 |
| Equilibrium Temperature, ° F. | | 5138 | 5082 | 5062 | 5043 |

A - Producer gas stream at 1 atm., 2780° F. (control).
B - Producer gas burned with 44.48 moles of $O_2$ added to stream at 200° F.
C - Producer gas burned with 44.48 moles of $O_2$ and 19.09 moles of $N_2$ added to stream at 200° F.
D - Producer gas burned with 55 moles of $O_2$ and 29.09 moles of $N_2$ added to stream at 200° F.
E - Producer gas burned with 33 moles of $O_2$ and 14.09 moles of $N_2$ added to stream at 200° F.

No sulfur removal was undertaken either prior to or subsequent to burning of the producer gas stream. As can be seen from the above table, the higher the concentration of oxygen and nitrogen in the producer gas stream when combusted, the higher the concentration of NO.

With the producer gas being under pressure during combustion with $N_2$ and $O_2$, higher concentrations of NO would be produced. Thus at 250 to 300 psi (absolute), there is a 35 to 45 percent increase in NO concentration in the combusted gas stream.

Because the NO decomposes to $N_2 + O_2$ rapidly with decreasing temperature, to fix the NO concentration, a rapid chilling must be effected. When a cooling rate of 30,000° F./second is effected, and the combusted gas is thereby reduced in 0.0367 seconds from 4300° F. to 3200° F. at atmospheric pressure, 25 percent of the NO decomposes to $N_2 + O_2$. Thus in accordance with the invention, cooling can be more rapid by expanding a pressurized gas rather than one at atmospheric pressure.

The adiabatic expansion of the combusted gas stream is accomplished by passing the gases through an accelerating nozzle such as a deLaval nozzle, which increases the velocity of the gas to supersonic levels (400 to 4000 m/sec.), with minimal expansion and pressure drop, for introduction into the MHD generator. In the MHD generator the pressurized gases are adiabatically expanded to completely fix the nitrogen oxides therein while simultaneously generating electric power.

Before the combusted gas is passed into the accelerating nozzle, it is seeded to increase its conductivity and ionization characteristics. The ability of a particular material to "seed" the combusted gas is a direct function of its ionization potential, the lower the ionization potential of the "seed", the greater the enhancement of the conductivity of the gas. Examples of "seed" elements are as follows:

| Element | Ionization Potential (electron volts) |
|---------|----------------------------------------|
| Cs | 3.89 |
| K  | 4.34 |
| Na | 5.14 |
| Li | 5.39 |

Cesium compounds are the most efficient for "seeding" but because of their higher cost over potassium they have not been extensively utilized. In the process of the invention, seeding with cesium is practical because the sulfur in the combusted gas stream has been removed before contacting the cesium salt. Hence the only solid material present in the combusted gas stream, after it leaves the MHD generator duct, is the cesium salt, which may be readily recovered. Usually the cesium may be added to the gas stream in the form of cesium carbonate, or a like salt, at a level of one to two percent by weight as Cs based on the total mass flow.

After the gas has been seeded, it is passed through nozzle means such as the deLaval type, which accelerate the gas velocity to supersonic speeds, i.e., 5,000 to 50,000 ft./sec., and further pass that gas into an MHD generator where it is adiabatically expanded and, thus, cooled to about 1000° F.

The MHD generator may be any of those known to a skilled artisan for generation of power by magneto hydrodynamics.

The gas from the MHD generator at about 1000° F., and containing the fixed nitrogen oxides, is transferred to a nitric acid production tower where the fixed nitric oxides are converted to nitric acid for subsequent use.

Conventional power generation is accomplished by moving metallic conductors through a magnetic field. In the process of MHD power generation according to the invention, the seeded combusted gas is passed through the magnetic field. The seeded gas at high temperature is a conductor passing through the magnetic field. The high temperature causes the gas to ionize, hence donate free electrons and cause the gas to be conductive.

Within the MHD generator is a heat exchanger system such as, for example, a water cooling coil which absorbs a substantial amount of energy raising the temperature of the water and producing steam therein which can be used to drive turbines for further production of electrical power in addition to the MHD generator.

Thus, in accordance with the invention, electric power is generated from both the MHD generator and the steam turbines, while simultaneously producing nitric acid from the resultant exhaust gas stream which is free of sulfuric acid, which provides an extremely efficient process for the recovery of $HNO_3$ and the production of nitric acid in conjunction with the electrical power generation.

The present invention presents a method of gasifying coal under elevated pressures prior to the introduction of an oxidizing agent wherein the sulfur is stripped from the gasified coal while the sulfur is in a gaseous state. A secondary combustion of the stripped gasified coal not only raises the temperature and adds oxygen, but also adds the necessary nitrogen into the plasma gas. The plasma gas is maintained at a high pressure while its velocity is accelerated. In the present invention, the plasma gas can be dropped rapidly enough, solely within the MHD generator, to fix substantially all of the nitrogen oxides in the plasma.

The key to rapidly cooling the gas within the MHD generator is to introduce the plasma therein at an elevated pressure to achieve a much greater expansion of the plasma, per unit of time, than if the gas were merely accelerated in velocity but reduced in pressure by a common expansion nozzle. Another principal feature of the present invention is to provide a method of secondary combustion which produces total oxidation of the products of coal gasification, thus forming much heavier molecules and, resulting in the reduction of the ionization potential of the plasma gas, itself, apart from the seeding elements, the effect of which is to increase the efficiency of electric energy production within the MHD generator.

These and other features of the present invention will be more completely disclosed and described in the following specification, the accompanying drawings and the appended claims.

DESCRIPTION OF THE PREFERRED EMBODIMENTS

Figure 1:
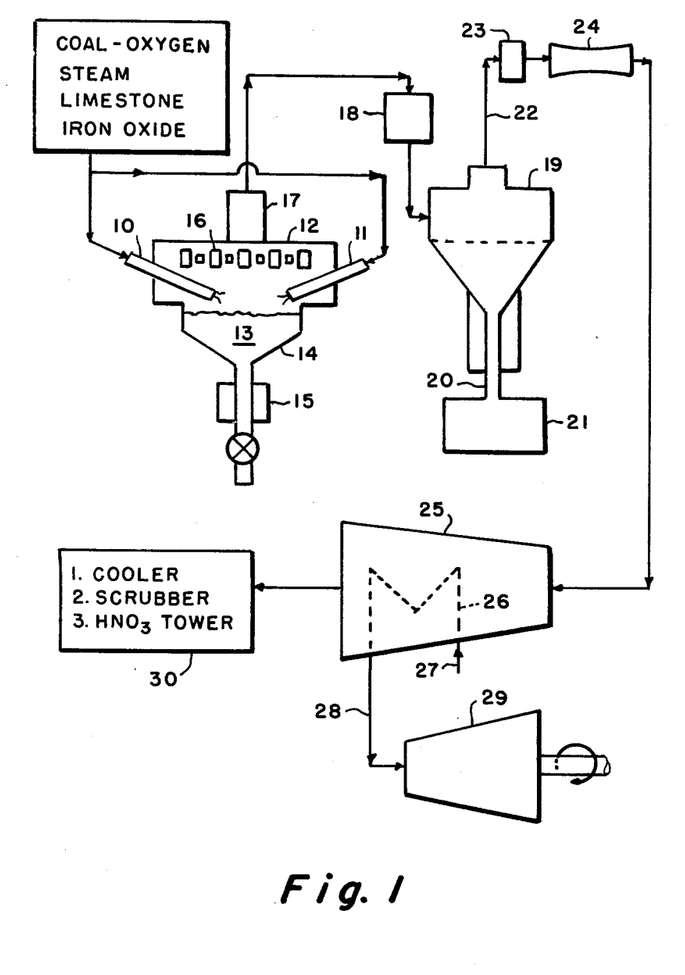
FIG. 1 is a diagrammatic view of the process of the invention using a gasification apparatus which impinges the products of reaction onto a slag bath.

Referring now to FIG. 1, coal, oxygen, steam, crushed limestone and iron oxide are introduced into burners 10 and 11 in gasifier 12. The limestone is introduced into the coal, oxygen, steam stream to react with the sulfer in the coal and provide ash fluxing during gasification. The iron oxide is also introduced for the same purpose and to provide a flux to reduce the slag solidification temperature.

The coal, oxygen, steam stream is combusted at superatmospheric pressure within the gasifier 12, reacting in the burner flame. The heat of the reaction is projected downward onto the surface of the slag bath 13 which flows down the conically tapered outlet 14 of the gasifier 12. While flowing down taper 14, the slag is slowly cooled and solidified when passed to the continuous caster 15. Hence the slag bath 13 provides a pressure seal which is continuously removed during gasification. The continuous cast slag has therein, precipitated out of the gasified coal, CaS and FeS which is the reaction product of the sulfur in the coal and the limestone and iron oxide.

During the continuous casting process, water is used to cool the slag which can be cycled for heat recovery.

In the gasification vessel 12, a refractory arch 16 is provided to aid in precipitation of the molten slag which is formed during the gasification reaction.

Superatmospheric pressure is maintained throughout the balance of the system upstream from the MHD generator 25.

The producer gas stream is passed through outlet 17 in gasifier 12. The gas emanates from the gasification outlet 17 at a temperature range of about 2600° F. to 2800° F. and is comprised mainly of CO and $H_2$ with lesser amounts of nitrogen and carbon dioxide. The gas stream is then passed into a mixing chamber 18 where oxygen enriched air, preheated to about 1500° F., is mixed with the producer gas stream. Lime is also added, at this point, to the producer gas stream. The gas stream is then conducted to a cyclone combustor. In the cyclone combustor, the combustion temperature range is about 4800° F. to 5200° F. In the cyclone combustor 19, the gaseous reactants are separated from the solid reaction product by inertial separation and the residual solids in the producer gas stream and the calcium sulfate, formed from the reaction of lime and $SO_2$, precipitate through outlet 20 and calcium sulfate hold zone 21. The completely oxidized gas stream is removed from the cyclone at outlet 22 and seeded with cesium carbonate in seeding zone 23. The seeded gas is passed through a deLaval nozzle 24 where its velocity is accelerated and pressure is maintained. The gas is then passed into the MHD generator 25 where it adiabatically expands from a pressure equal to the superatmospheric pressure within the gasifier 12 to ambient pressure. The gas, at about 5000° F., is cooled by expansion to about 1000° F. Essentially all of the nitrogen oxides in the gas stream at about 5000° F. are retained on emanation from the MHD generator 25. The resultant gas stream from the MHD generator is then transferred to a nitric acid tower 30 where the nitric oxides are converted to nitric acid.

In the MHD generator 25 is a cooling coil 26 which maintains the material of the apparatus at operable temperatures. Water, issuing into line 27 and through coil 26 is converted to steam in the coil 26 and the steam is removed by the line 28 in communication with the steam turbine 29 used to further generate electricity in conjunction with the MHD generator.

The calcium sulfate recovered from the cyclone combustor can be converted to calcium carbonate which can be further used for mixture with the coal oxygen stream fed into nozzle 10 or may be used as the lime sorbent to be fed into the cyclone combustor. Further, the sulfur recovered in the calcium sulfate regeneration process can be used to produce $SO_2$ for the production of sulfuric acid or may be reduced to elemental sulfur.

Figure 2:
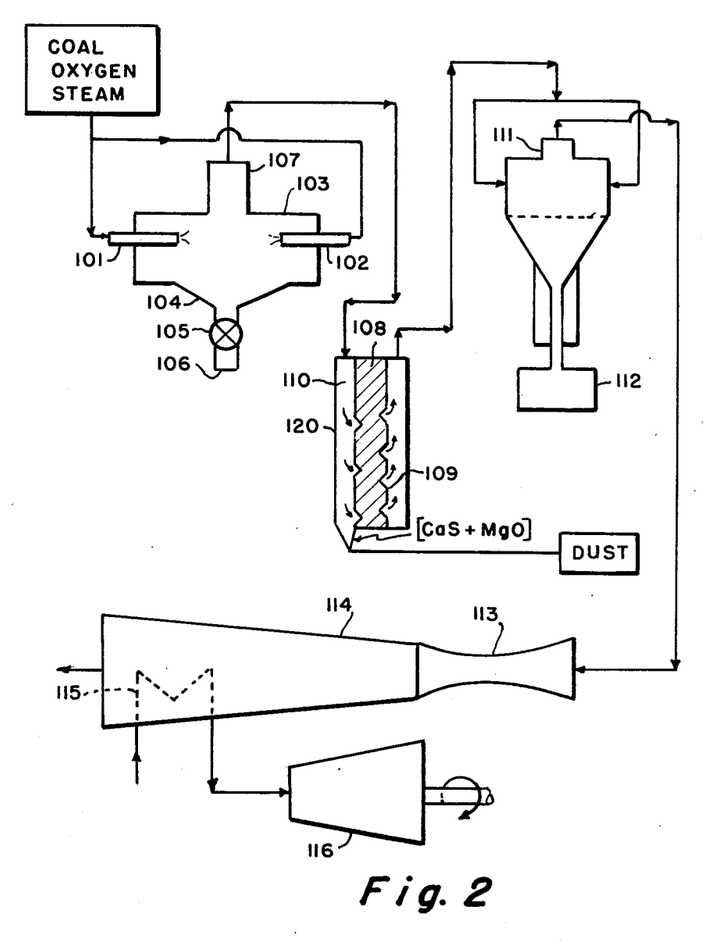
FIG. 2 is a diagrammatic view of the process of the invention having a gasification method wherein the reactant coal oxygen stream is emanating from juxtaposed nozzles.

Referring now to FIG. 2, the coal oxygen stream is introduced to juxtaposed nozzles 101 and 102 which are lying along the same axis. Several pairs of nozzles, and in this embodiment four, are used in the gasification vessel 103. During superatmosphereic pressure gasification of the coal, oxygen, steam stream, the slag produced from the coal is passed down the conically tapered outlet 104 of the gasifier 103 and passed through decompression chamber 105 and through outlet 106 for disposal.

Superatmospheric pressure is maintained throughout the balance of the system upstream from the MHD generator 114.

The producer gas stream passes through outlet 107 in gasifier 103 at a temperature range of about 2600° F. to 2800° F. In this embodiment of the invention, the producer gas stream at 2700° F. is passed into a cross-flow bed reactor 120 which is charged with calcium carbonate and magnesium oxide through inlet 108 and into chamber 109. The product gas stream introduced into chamber 110 is contacted with the calcium carbonate and magnesium oxide to form solid state CaS and MfS. The CaS and MgS may be recovered and converted to sulfur, calcium carbonate and magnesium oxide which can be recycled. The gas, completely free of sulfur, is passed to a cyclone combustor 111 and reacted with oxygen enriched air which has been preheated to about 1500° F., as previously described in FIG. 1. However, the solids accummulation from the cyclone combustor 111 is just dust and slag accummulated in the solid recovery zone 112 of the cyclone combustor. A clean gas stream emanating from the cyclone combustor at a critical temperature range for this invention of about 4800° F. to 5200° F. is passed through a deLaval nozzle 113 and accelerated to a supersonic velocity without appreciable pressure drop. The accelerated gas then passes into the MHD generator 114 wherein it is adiabatically expanded from a pressure equal to the superatmospheric pressure within the gasification vessel 103 to ambient pressure, as in FIG. 1, and the nitrogen oxides are fixed. The gas, with the nitrogen oxides therein, is then passed to a process for converting the nitric oxides to nitric acid.

As in FIG. 1, the gas is seeded after exit from the cyclone combustor 111, but prior to entry into the deLaval nozzle 113.

Within the MHD generator, just as in FIG. 1, a cooling coil 115 is provided which produces steam therein to drive turbines 116 for further power in addition to the electricity generated by the MDH generator.

According to the provisions of the patent statutes, the principle, preferred embodiments and mode of operation of the present invention have been illustrated and described. However, it is to be understood that, within the scope of the appended claims, the invention may be practiced otherwise than as specifically illustrated and described.

What is claimed is:

1. A method of using gases of combustion to concurrently generate electricity and fix nitrogen oxides comprising:
   a. combusting coal in an oxygen rich, air free atmosphere within a reactor at superatmospheric pressure and within a temperature range of 2800° F. to 3200° F. to form a producer gas stream rich in CO and $H_2$ and including molten inorganic impurities and gaseous sulfur and sulfur compounds;
   b. collecting said inorganic impurities in the bottom of said reactor;
   c. removing said inorganic impurities from said bottom of said reactor such that said superatmospheric pressure within said reactor is maintained;
   d. removing said producer gas stream from said reactor within a temperature range of 2600° F. to 3000° F. while maintaining said producer gas at said superatmospheric pressure;
   e. substantially removing said gaseous sulfur and sulfur compounds from said producer gas stream while maintaining said producer gas at said superatmospheric pressure;
   f. combining said producer gas with an oxidant gas which is rich in nitrogen and includes lime, while maintaining the resultant mixture at said superatmospheric pressure, to form a combustion gas;
   g. combusting said combustion gas at said superatmospheric pressure within a critical temperature range which is above that at which nitrogen oxides are formed, to form a combustion products gas;
   h. precipitating out of said combustion products gas all remaining said gaseous sulfur and sulfur compounds by reacting said gaseous sulfur and sulfur compounds with lime to form liquified solid particles of CaS, while maintaining said combustion products gas at said superatmospheric pressure and within said critical temperature range;

i. after precipitating out all said gaseous sulfur and sulfur compounds from said combustion products gas, adding to said combustion products gas an alkali metal salt, while maintaining said combustion products gas at said superatmospheric pressure and within said critical temperature range to form a seeded gas;

j. accelerating the velocity of said seeded gas to a supersonic velocity while maintaining said seeded gas at said superatmospheric pressure and within said critical temperature range;

k. passing said seeded gas at said supersonic velocity and at said superatmospheric pressure and within said critical temperature range into an MHD generator, thereby generating electricity;

l. adiabatically expanding the volume of said seeded gas while simultaneously reducing said superatmospheric pressure to atmospheric pressure and simultaneously reducing the temperature of said seeded gas at a rate sufficient to fix substantially all of the nitrogen oxides therein all within said MHD generator;

m. extracting said alkali metal for recycling; and n. collecting said nitrogen oxides.

2. The method described in claim 1 further comprising converting said collected nitrogen oxides into nitric acid.

3. The method described in claim 1 wherein said superatmospheric pressure is within a range of 250 to 300 psi.

4. The method described in claim 1 wherein said critical temperature range is a range of from 4800° F. to 5200° F.

5. The method described in claim 1 wherein said oxidant gas which is rich in nitrogen comprises air which is enriched with additional oxygen.

6. The method described in claim 1 wherein said gaseous sulfur and sulfur compounds are substantially removed from said producer gas stream by reacting said gaseous sulfur and sulfur compounds with a mixture of $CaCO_3$ and $MgO$, said mixture which is preheated to about 1500° F., to form $CaS$ and $MgS$ which is precipitated out of said producer gas stream as a liquified solid, while maintaining said producer gas stream at said superatmospheric pressure and within said critical temperature range.

7. The method described in claim 1 wherein said superatmospheric pressure within said reactor is maintained, upon removal of said inorganic impurities from said bottom of said reactor, by removing said inorganic impurities through a decompression chamber.

8. The method described in claim 1 wherein said seeded gas is reduced in temperature within said MHD generator to about 1000° F.

9. The method described in claim 1 further comprising:
  a. cooling said MHD generator by conducting water through a series of cooling conduits implanted in said MHD generator;
  b. producing steam under pressure by said cooling;
  c. conducting said steam to a steam turbine generator; and
  d. operating said steam turbine generator with said steam to produce electricity.

10. The method described in claim 3 wherein said seeded gas is reduced in temperature within said MHD generator to about 1000° F.

11. The method described in claim 1 further comprising:
  a. entraining said coal into steam which is at a pressure greater than said superatmospheric pressure within said reactor; and
  b. introducing said coal entrained in said steam into said reactor thereby excluding said air from said reactor.

12. The method described in claim 1 wherein said seeded gas is accelerated to a supersonic velocity by directing said seeded gas through a deLaval nozzle.

13. A method of using gases of combustion to concurrently generate electricity and fix nitrogen oxides comprising:
  a. combusting coal in an oxygen rich, air free atmosphere within a reactor at superatmospheric pressure and within a temperature range of 2800° F. to 3200° F. to form a producer gas stream rich in CO and $H_2$ and including molten inorganic impurities and gaseous sulfur and sulfur compounds;
  b. collecting said inorganic impruities in the bottom of said reactor;
  c. removing said inorganic impurities from said bottom of said reactor, such that said superatmospheric pressure is maintained within said reactor, through a decompression chamber;
  d. substantially removing said gaseous sulfur and sulfur compounds from said producer gas stream, within said reactor, by reaction and precipitation;
  e. removing said producer gas stream from said reactor within a temperature range of 2600° F. to 3000° F. while maintaining said producer gas at said superatmospheric pressure;
  f. combining said producer gas with an oxidant gas which is rich in nitrogen and includes lime, while maintaining the resultant mixture at said superatmospheric pressure, to form a combustion gas;
  g. combustion said combustion gas at said superatmospheric pressure and within a critical temperature range which is above that at which nitrogen oxides are formed to form a combustion products gas;
  h. precipitating out of said combustion product gas all remaining said gaseous sulfur and sulfur compounds by reacting said gaseous sulfur and sulfur compounds with lime to form solid particles of CaS, while maintaining said combustion gas at said superatmospheric pressure and within said critical temperature range of said combustion products gas;
  i. after precipitating out all said gaseous sulfur and sulfur compounds from said combustion products gas, adding to said combustion products an alkali metal salt, while maintaining said combustion products gas at said superatmospheric pressure and within said critical temperature range, to form a seeded gas;
  j. accelerating the velocity of said seeded gas to a supersonic velocity while maintaining said seeded gas at said superatmospheric pressure and within said critical temperature range;
  k. passing said seeded gas at said supersonic velocity and at said superatmospheric pressure and within said critical temperature range into an MHD generator, thereby generating electricity;
  l. adiabatically expanding the volume of said seeded gas while simultaneously reducing said superatmospheric pressure to atmospheric pressure and simultaneously reducing the temperature of said seeded gas at a rate sufficient to fix substantially all of the nitrogen oxides therein, all within said MHD generator;

m. extracting said alkali metal salt for recycling; and n. collecting said nitrogen oxides.

14. The method described in claim 13 further comprising:

a. reducing the melting point of said molten inorganic impurities within said reactor; and b. reducing the viscosity of said molten inorganic impurities to enable substantially all of said molten inorganic impurities to collect at said bottom of said reactor.

15. The method described in claim 13 further comprising converting said collected nitrogen oxides into nitric acid.

16. The method described in claim 13 wherein said superatmospheric pressure is within a range of 250 to 300 psi.

17. The method described in claim 13 wherein said critical temperature range is a range of from 4800° F. to 5200° F.

18. The method described in claim 13 wherein said oxidant gas which is rich in nitrogen comprises air which is enriched with additional oxygen.

19. The method described in claim 14 wherein said reduction in the melting point of said molten inorganic impurities and said reduction in the viscosity of said molten inorganic impurities is concurrently accomplished by entraining a substance rich in $CaCO_3$ in said coal prior to said combusting of said coal.

20. The method described in claim 13 wherein said substantially removing said gaseous sulfur and sulfur compound from said producer gas stream is accomplished by entraining a mixture of limestone and iron oxide in said coal prior to said combusting of said coal and reacting said mixture of said limestone and said iron oxide with said gaseous sulfur and sulfur compounds within said reactor.

21. The method described in claim 14 wherein said molten inorganic impurities collected at said bottom of said reactor are maintained in a molten state by the impingement of the heat of said combustion of said coal onto the surface of a molten pool of said molten inorganic impurities.

22. The method described in claim 21 wherein said molten inorganic impurities are removed from said bottom of said reactor by continuously casting said molten pool at a rate sufficient to maintain a sufficient amount of said molten inorganic impurities in said molten pool within said reactor to form a pressure seal sufficient to maintain said superatmospheric pressure within said reactor.

23. The method described in claim 13 wherein said seeded gas is reduced in temperature within said MHD generator to about 1000° F.

24. The method described in claim 16 wherein said seeded gas is reduced in temperature within said MHD generator to about 1000° F.

25. The method described in claim 13 further comprising:

a. cooling said MHD generator by conducting water through a series of cooling conduits implanted in said MHD generator;

b. producing steam under pressure by said cooling;

c. conducting said steam to a steam turbine generator; and d. operating said steam turbine generator with said steam to produce electricity.

26. The method described in claim 13 further comprising:

a. entraining said coal into steam which is at a pressure greater than said superatmospheric pressure within said reactor; and b. introducing said coal entrained in said steam into said reactor, thereby excluding air from said reactor.

27. The method described in claim 13 wherein said seeded gas is accelerated to a supersonic velocity by directing said seeded gas through a deLaval nozzle.

28. A method of using gases of combustion to concurrently generate electricity and fix nitrogen oxides comprising:

a. entraining coal in high pressure steam;

b. injecting said coal entrained in said high pressure steam into a reactor;

c. combusting said coal in an oxygen rich, air free atmosphere, within said reactor, at a pressure within the range of 250 to 300 psi, but less than the pressure of said high pressure steam, and within a temperature range of 2800° F. to 3200° F., to form a producer gas stream rich in CO and $H_2$ and which includes molten inorganic impurities and gaseous sulfur and sulfur compounds;

d. collecting said inorganic impurities in the bottom of said reactor;

e. removing said inorganic impurities from said bottom of said reactor such that said pressure within said reactor is maintained;

f. removing said producer gas stream from said reactor within a temperature range of 2600° F. to 3000° F. while maintaining said producer gas stream at a pressure equal to said pressure within said reactor;

g. substantially stripping said gaseous sulfur and sulfur compounds from said producer gas stream by reacting said gaseous sulfur and sulfur compounds with a mixture of $CaCO_3$ and MgO, said mixture which is preheated to about 1500° F., to form CaS and MgS, which is precipitated out of said producer gas stream as a liquified solid, while maintaining said producer gas stream at said pressure equal to said pressure within said reactor;

h. combining said stripped producer gas stream with air, which is enriched with oxygen, said air having lime entrained in it, to form a combustion gas, while maintaining said pressure equal to said pressure within said reactor;

i. combusting said combustion gas at a temperature within the range 4800° F. to 5200° F. to form nitrogen oxides and resulting in the formation of a combustion products gas, while maintaining said pressure equal to said pressure within said reactor;

j. precipitating out of said combustion products gas all remaining said gaseous sulfur and sulfur compounds by reacting said gaseous sulfur and sulfur compounds with said lime to form liquified solid particles of CaS, while maintaining said pressure equal to said pressure within said reactor and maintaining said temperature of said combustion products gas within the range 4800° F. to 5200° F.;

k. after precipitating out all said gaseous sulfur and sulfur compounds from said combustion products gas, adding to said combustion products gas an alkali metal salt, while maintaining said combustion products gas at said pressure equal to said pressure within said reactor and maintaining said temperature of said combustion products gas within the range 4800° F. to 5200° F., to form a seeded gas;

l. accelerating the velocity of said seeded gas to a supersonic velocity by directing said seeded gas through a deLaval nozzle while maintaining said seeded gas at said pressure equal to said pressure within said reactor and maintaining said temperature of said seeded gas within the range 4800° F. to 5200° F;

m. passing said seeded gas, at said supersonic velocity and at said pressure equal to said pressure within said reactor and within the temperature range 4800° F. to 5200° F., into an MHD generator, thereby generating electricity; and n. adiabatically expanding the volume of said seeded gas while simultaneously reducing the pressure to atmospheric pressure and simultaneously reducing the temperature to about 100° F., all within said MHD generator, to fix substantially all of the said nitrogen oxides.

29. The method described in claim 28 further comprising converting said nitrogen oxides into nitric acid.

30. The method described in claim 28 further comprising:
a. cooling said MHD generator by conducting water through a series of cooling conduits implanted in said MHD generator;
b. producing steam under pressure by said cooling;
c. conducting said steam to a steam turbine generator; and
d. operating said steam turbine generator with said steam to produce electricity.

31. A method of using gases of combustion to concurrently generate electricity and fix nitrogen oxides comprising:
a. entraining coal, limestone and iron oxide in high pressure steam;
b. injecting said coal, limestone and iron oxide in said high pressure steam into a reactor;
c. combusting said coal in an oxygen rich, air free atmosphere within said reactor, at a pressure within the range of 250 to 300 psi, but less than the pressure of said high pressure steam, and within a temperature range of 2800° F. to 3200° F., to form a producer gas stream rich in CO and $H_2$ and which includes molten inorganic impurities and gaseous sulfur and sulfur compounds;
d. reducing the melting point of said molten inorganic impurities within said reactor concurrent with said combustion of said coal by combining said molten inorganic impurities with $CaCO_3$ produced from the combustion heat decomposition of said limestone;
e. reducing the viscosity of said molten inorganic impurities within said reactor concurrent with said combustion of said coal by combining said molten inorganic impurities with $CaCO_3$ produced from the combustion heat decomposition of said limestone;
f. collecting said molten inorganic impurities in the bottom of said reactor;
g. maintaining said molten inorganic impurities collected in said bottom of said reactor by impinging the heat of combustion of said coal onto the surface of a molten pool of said molten inorganic impurities;
h. removing said molten inorganic impurities from said bottom of said reactor by continuously casting said molten pool at a rate sufficient to maintain a sufficient amount of said molten inorganic impurities in said molten pool to form a pressure seal sufficient to maintain said pressure within said reactor at 250 to 300 psi;
i. reacting said gaseous sulfur and sulfur compounds with a mixture of said limestone and said iron oxide within said reactor to produce precipitants of FeS and CaS within said molten inorganic impurities and thus substantially removing said gaseous sulfur and sulfur compounds from said producer gas stream;
j. removing said producer gas stream from said reactor within a temperature range of 2600° F. to 3000° F. while maintaining said producer gas stream at a pressure equal to said pressure within said reactor;
k. combining said producer gas stream with air, which is enriched with oxygen, said air having lime entrained in it, to form a combustion gas, while maintaining said pressure equal to said pressure within said reactor;
l. combusting said combustion gas at a temperature within the range 4800° F. to 5200° F. to form nitrogen oxides and resulting in the formation of a combustion products gas, while maintaining said pressure equal to said pressure within said reactor;
m. precipitating out of said combustion products gas all remaining said gaseous sulfur and sulfur compounds by reacting said gaseous sulfur and sulfur compounds with said lime to form liquified solid particles of CaS, while maintaining said pressure equal to said pressure within said reactor and maintaining said temperature of said combustion products gas within the range 4800° F. to 5200° F.;
n. after precipitating out all said gaseous sulfur and sulfur compounds from said combustion products gas, adding to said combustion products gas an alkali metal salt, while maintaining said combustion products gas at said pressure equal to said pressure within said reactor and maintaining said temperature of said combustion products gas within the range 4800° F. to 5200° F., to form a seeded gas;
o. accelerating the velocity of said seeded gas to a supersonic velocity by directing said seeded gas through a deLaval nozzle, while maintaining said seeded gas at said pressure equal to said pressure within said reactor and maintaining said temperature of said seeded gas within the range 4800° F. to 5200° F.;
p. passing said seeded gas, at said supersonic velocity and at said pressure equal to said pressure within said reactor and within the temperature range 4800° F. to 5200° F., into a MHD generator, thereby generating electricity;
q. adiabatically expanding the volume of said seeded gas while simultaneously reducing the pressure to atmospheric pressure and simultaneously reducing the temperature to about 1000° F., all within said MHD generator, to fix said nitrogen oxides;
r. extracting said alkali metal salt for recycling; and
s. collecting said nitrogen oxides.

32. The method described in claim 31 further comprising converting said nitrogen oxides into nitric acid.

33. The method described in claim 31 further comprising:
a. cooling said MHD generator by conducting water through a series of cooling conduits implanted in said MHD generator;
b. producing steam under pressure by said cooling;
c. conducting said steam to a steam turbine generator; and
d. operating said steam turbine generator with said steam to produce electricity.

* * * * *